Jan. 24, 1933.  C. F. WATTS  1,894,967
TELEGRAVURE APPARATUS

Original Filed Dec. 31, 1930  5 Sheets-Sheet 1

Inventor
Cecil F. Watts
By Mason Fenwick & Lawrence
Attorneys

Jan. 24, 1933. C. F. WATTS 1,894,967
TELEGRAVURE APPARATUS
Original Filed Dec. 31, 1930    5 Sheets-Sheet 2

Inventor
Cecil F. Watts
By Mason, Fenwick & Lawrence
Attorneys

Jan. 24, 1933.　　　C. F. WATTS　　　1,894,967
TELEGRAVURE APPARATUS
Original Filed Dec. 31, 1930　　5 Sheets-Sheet 3

Inventor
Cecil F. Watts

By Mason Fenwick & Lawrence
Attorney

Jan. 24, 1933.     C. F. WATTS     1,894,967

TELEGRAVURE APPARATUS

Original Filed Dec. 31, 1930     5 Sheets-Sheet 4

Inventor
Cecil F. Watts

By Mason Fenwick & Lawrence
Attorneys

Jan. 24, 1933.    C. F. WATTS    1,894,967
TELEGRAVURE APPARATUS
Original Filed Dec. 31, 1930    5 Sheets-Sheet 5

Fig.18.

Inventor
Cecil F. Watts
By Mason Fenwick Lawrence
Attorneys

Patented Jan. 24, 1933

1,894,967

UNITED STATES PATENT OFFICE

CECIL FRANCIS WATTS, OF MIAMI, FLORIDA

TELEGRAVURE APPARATUS

Application filed December 31, 1930, Serial No. 505,855. Renewed March 31, 1932.

The invention forming the subject matter of this application is an improvement upon the telegravure apparatus disclosed in my copending application, Serial No. 392,585, September 14, 1929, of which application the present case is a continuation-in-part.

The invention relates to apparatus and methods involving the telegraphic transmission of pictures, photographs, drawings, signatures, etc., and to the art of facsimile telegraphy in general.

The main object of the invention is to provide apparatus of this character with a very simple and improved combined transmitter-receiver which can be very cheaply manufactured and easily operated, and by which the transmitted original may be reproduced directly in such form as to adapt the reproduction for immediate use in the printing of the reproduced matter in newspapers, especially, where a screened half tone is necessary to bring out the various shadings of the original.

Another object of the invention is to provide an apparatus of this character in which the transmitter-receiver at both sending and receiving stations are identical in construction, and in which the functions of the transmitter-receiver can be reversed at will, so that each instrument can send as well as receive.

A still further object of the invention is to provide apparatus of this character with a sender-receiver mechanism in which the adjustment of a tracer or graver over the sending or receiving surface is so minutely regulated as to insure an overlap of the scanning or engraving lines.

Another object of the invention is to provide an apparatus of this kind with a sender-receiver embodying rotatable discs having their speeds of rotation varied as the tracer and graving elements move from the center of the disc toward the outer edge thereof.

Other objects of the invention will become apparent as the detailed description thereof proceeds.

In this system of telegravure the sending and receiving instruments are similar in every respect. Any one of these instruments may control any number of similar instruments, either by direct electrical connection, or by connection to any suitable radio transmission system. Since the instruments employed are similar, whether used for transmitting or receiving purposes, it will be sufficient to describe in detail the construction of one of them; at the end of which description, the reciprocal operation of two of them will be described in detail in connection with the diagrammatic Figure 18.

Figure 1:
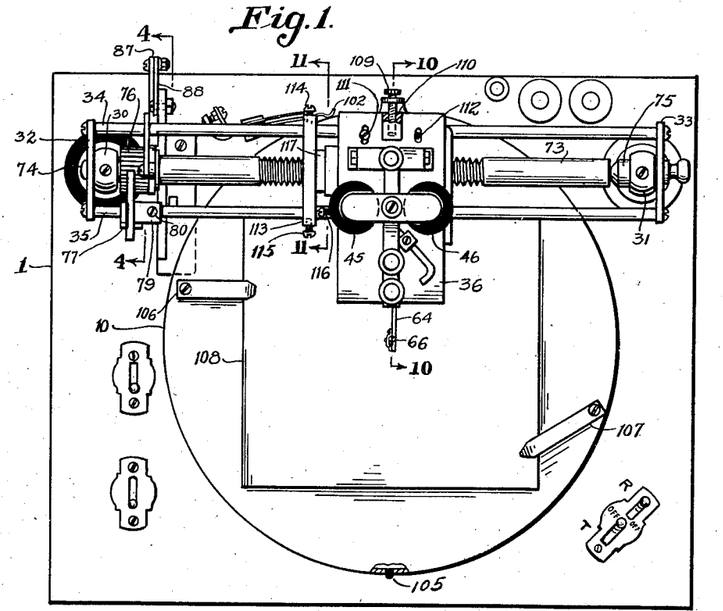
Figure 1 is a top plan view of a sender-receiver forming one of the elements of this system.
Figure 2:
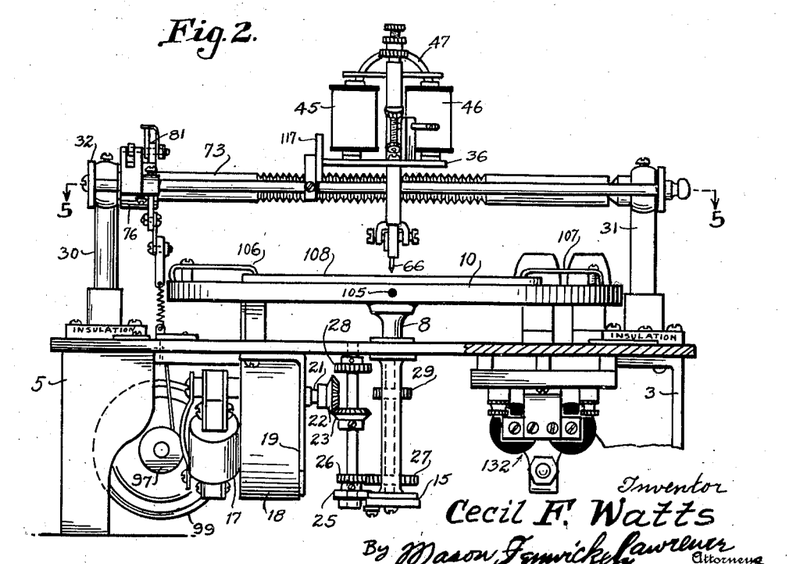
Figure 2 is a front elevation of the instrument shown in Figure 1.
Figure 3:
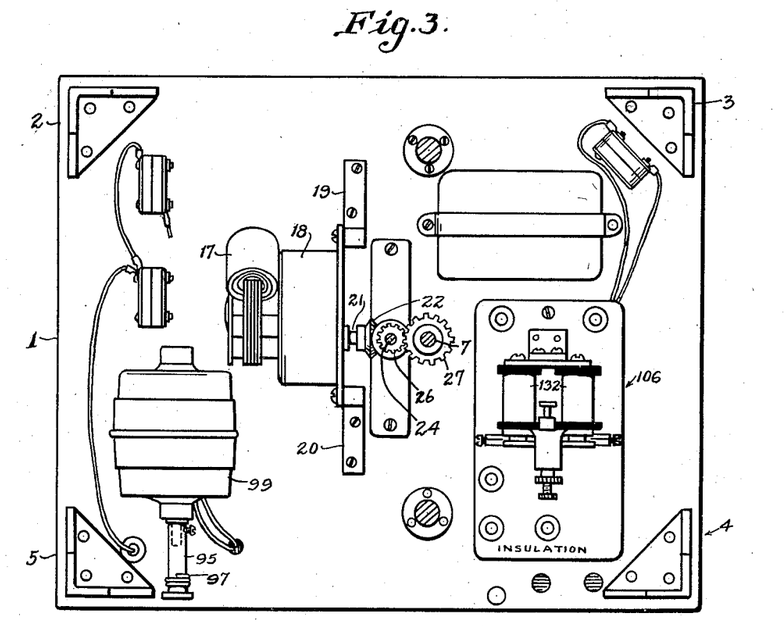
Figure 3 is a bottom plan view of the said instrument.

As shown particularly in Figures 1, 2 and 3 each instrument comprises a table 1, supported by standards 2, 3, 4, and 5. Journaled in a suitable bearing 6 in the center of the table 1 (see Figure 10) is a vertical shaft 7 provided at the upper end with a flange 8 adapted to receive and form a seat for the hub 9 of a disc 10, designed to support, in a predetermined position thereon, an electrically conducting plate of material upon which matter to be transmitted is formed or on which matter to be received is graved. Centrally of the flange 8, the shaft 7 is provided with a screw threaded stud 11 adapted to be screwed into an internally screw-threaded recess 12 formed centrally in the hub 9.

The shaft 7 has its lower end 13 rounded to seat in a step bearing 14 of hardened material suitably secured to a bridge member 15, which extends substantially parallel with the lower face of the table 1 and is suspended suitably from said lower face by standard 16.

The disc 10 is rotated by means of a synchronous motor 17 mounted on the side of a gear box 18 which is suitably secured to the lower face of the table 1 by means of angle brackets 19 and 20. A shaft 21 (see Figures 2 and 3) extends from the gear box and is provided at its end with a bevel gear 22 in mesh with a similar gear 23 suitably secured to a shaft 24 which is journaled at its upper end in the lower face of the table 1, and at its lower end is journaled in a step bearing formed in a bracket 25 extending laterally from the bridge 15.

A pinion 26 secured detachably to the shaft 24 meshes with a spur gear 27 fixed at the lower end of the shaft 7, and serves to communicate the rotation of the shaft 24 to the shaft 7 at any suitable reduction ratio corresponding to the ratio of the pinion 26 to the gear 27. A gear 28 is suitably secured to the upper end of the shaft 24 to mesh with a gear 29 adjustably mounted on the shaft 7 and adapted to be moved into engagement with the pinion 28 at the same time as the pinion 26 is disengaged from gear 27.

Figures 6, 7:
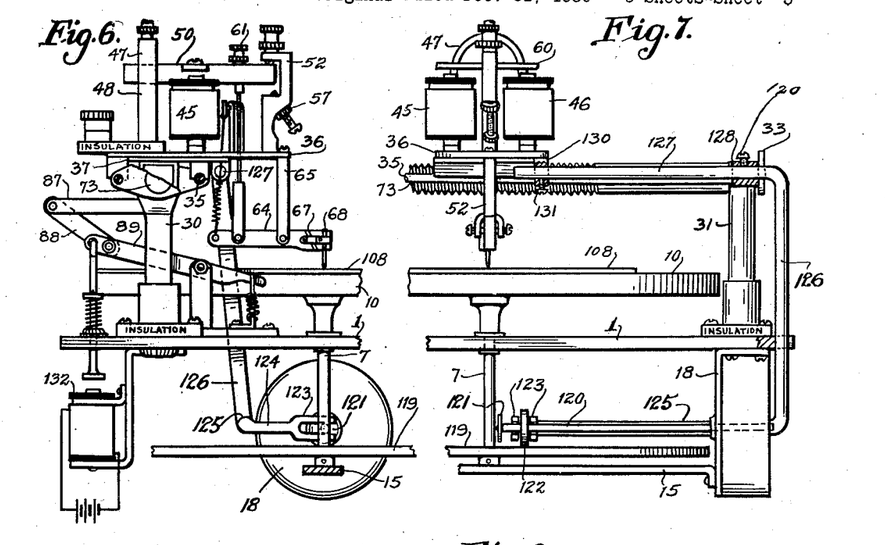
Figure 6 is a fragmentary side elevation of a part of a sender-receiver illustrating the scanning and graving mechanism thereof, along with a variable speed drive for the rotatable disc of the instrument upon which the image plates are adapted to be secured.
Figure 7 is a fragmentary front elevation of the apparatus shown in Figure 6.

The change speed gearing for the disc 10 illustrates very crudely a mechanism for varying the speed of the disc. A preferred form of this change speed gearing is illustrated in Figures 6 and 7 and will be described in connection with the mechanism for feeding a traver or graver diametrically of the rotating disc 10.

Adjacent the rear end of the table 1 there is mounted a pair of standards 30 and 31 having cross plates 32 and 33 secured to their respective upper ends. A pair of parallel guide rods 34 and 35 have their ends suitably secured to the cross plates 32 and 33 and are adapted to form a sliding support for a tool plate 36 constructed to support the mechanism for moving the tracer or graver of the instrument diametrically across the disc 10.

Figure 8:
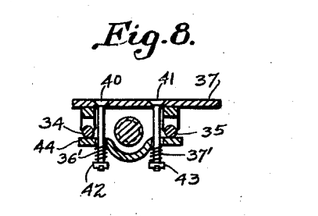
Figure 8 is a vertical section taken on the line 8—8 of Figure 13.

In order to support the tool plate 36 slidably upon the guide rods 34 and 35, the under side of the plate 36 has secured thereto a supporting bracket plate 37 having downturned flanges 38 and 39 provided at their lower end with V-shaped notches adapted to seat on the guide rods 34 and 35 in a manner common to devices of this kind, and very common in typewriter construction. To prevent accidental displacement of the guide flanges 38 and 39 from the rods 34 and 35, the plate 37 is provided with two downwardly extending parallel rods 40 and 41 (see Figure 8), screw threaded at their lower ends to receive nuts 42 and 43 respectively. The rods 41 and 42 pass freely through apertures formed in a retaining plate 44 which is held in yielding contact against the guide rods 34 and 35 by means of the springs 36" and 37' interposed between the nuts 42 and 43 and the retaining plate 44. The structural relationship of these retaining elements will be apparent from inspection of Figure 8 of the drawings.

Figures 10, 11, 12, 13, 14, 15, 16, 17:
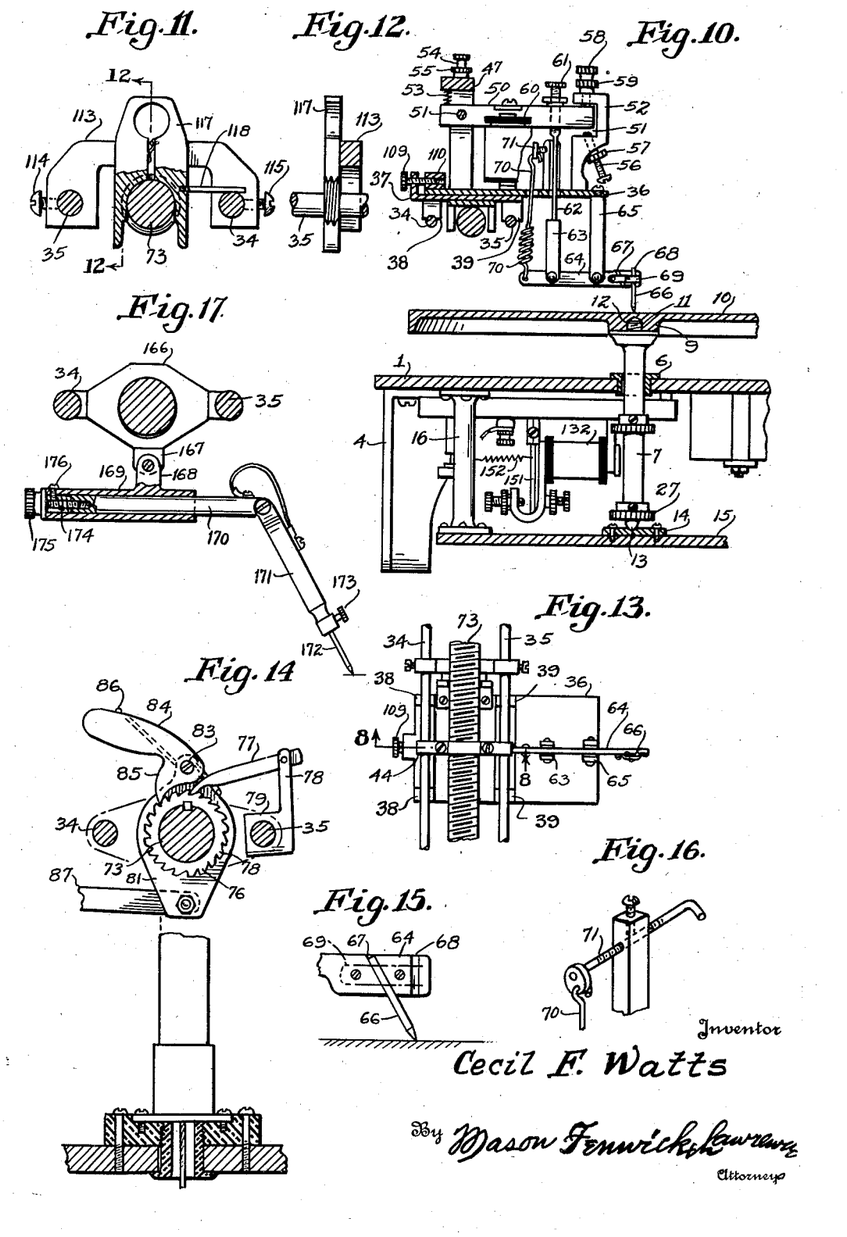
Figure 10 is a fragmentary vertical section taken on the line 10—10 of Figure 1.
Figure 11 is a vertical section taken on the line 11—11 of Figure 1.
Figure 12 is a vertical transverse section taken on the line 12—12 of Figure 11.
Figure 13 is a fragmentary bottom plan view of the supporting element for the combination scanner and graver.
Figure 14 is a fragmentary detail illustrating part of the mechanism for intermittently moving the scanner-graver.
Figure 15 is a fragmentary side elevation of a holder in which the scanner or graver of the sender-receiver may be secured in either sending or receiving position.
Figure 16 is a fragmentary detail in perspective of part of the scanner-graver mechanism.
Figure 17 is a fragmentary side elevation with parts shown in sections of a modified form of the invention in which one of the elements is adapted for sending only and not for receiving.

The tool plate 36 has suitably secured thereto a pair of electro-magnets 45 and 46; and at the rear of said electro-magnets carries an inverted U-shaped support 47, between the legs 48 and 49 on which a lever 50 is suitably pivoted, as by pivot 51 (see Figure 10).

The free end of the lever 50 extends into a notch 51 formed at the upper end of a standard 52 which is suitably secured to the tool plate 36 in front of the electro-magnets 45 and 46. The lever 50 is held normally in contact with the upper wall of the notch 51 by means of a compression spring 53 interposed between the rear end of the lever 50 and the cross wall of the U-shaped support 47, screw 54, with lock nuts 55, extends through said upper wall and is connected to said spring 53 to regulate the pressure thereof upon the end of the lever 50.

The position of the free end of the lever 50 is adapted to be regulated by means of the screw 56 which is suitably threaded into an aperture passing at an angle through standard 52 and into the lower wall of the notch 51. The extent of projection of the screw 56 through the said lower wall regulates the distance through which the free end of the lever 50 moves downwardly toward the plate 36; and a lock nut 57 threaded on the screw 56 serves to lock the said screw 56 in adjusted position.

The extent of upward movement of the free end of the lever 50 in the notch 51 may be controlled by means of a screw 58 threaded into the upper horizontal wall of said notch 51, and a lock nut 59 serves to lock the screw 58 in adjusted position. It will be obvious from Figure 10 of the drawings that the screws 56 and 58 may be adjusted into contact with the upper and lower edges of the lever 50 to hold the lever locked in position in the notch 51 whenever it is desired to be so secured for carrying purposes.

The lever 50 is provided intermediate its ends with an armature 60 adapted to be attracted by the electro-magnets 45 and 46 when the latter are energized. Between the electro-magnets and the standard 52 the lever 50 is provided with a screw threaded aperture adapted to receive the screw threaded part 61 of a rod 62, the lower end of which extends into contact with the upper end of a plate 63 extending upwardly from and fixed rigidly to one arm of a tool supporting lever 64.

The lever 64 is pivoted between its ends to a supporting rod 65 secured at its upper end to the front of the tool plate 36 and is bifurcated at its lower end to form a pivotal connection or fulcrum for the lever 64. At its front end the lever 64 is provided with suitable means for securing a scanning or engraving tool 66 in properly adjusted position. When used as a tracer the tool 66 should preferably be inclined in order to bear lightly on the image formed on the plate to be transmitted; and should be positioned substantially perpendicular to said plate or a similar plate when used for engraving purposes. In order to effect this positioning of the tool 66 one arm of the lever 64 is provided with aperture 67 and 68 adapted to receive the tool 66 in inclined scanning or vertical graving positions, respectively, a clamping plate 69 being used to secure the tool 66 in either position of adjustment.

The other end of the lever 64 has the lower end of a tension spring 70 secured thereto; and the upper hooked end of this tension spring 70 is adapted to be detachably secured to an eye 71 formed on a standard 72 suitably fixed in convenient position on the plate 36, an aperture being formed in said plate 36 to permit the passage therethrough of a straight part of the tension spring 70.

The mechanism supported on the upper face of the plate 36 is of standard construction but the mechanism below said plate for supporting the tool 66 and all the other elements carried by the plate 36 to control its rectilinear movement form parts of the present invention and are specially designed for use in machines of this character.

In order to move the tool plate 36 and the mechanism carried thereby along the guide rods 34 and 35 there is provided a screw threaded shaft 73 which is pivoted between its ends by means of the conical ended screws 74 and 75 extending through correspondingly threaded apertures formed in the upper end of the standards 30 and 31, respectively.

As shown in Figure 1 and 2 of the drawings, the end of the screw 73 adjacent the standard 74 has a ratchet gear 76 suitably secured thereto. A pawl 77 (see Figure 14) is pivotally connected at one end to an arm 78 projecting upwardly from a sleeve bracket 79, which is slidably mounted on the guide rod 34 and adapted to be secured thereon by means of the set screw 80.

Figure 4:
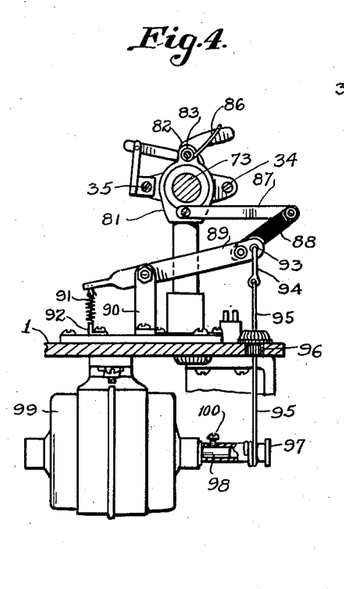
Figure 4 is a fragmentary vertical section taken on the line 4—4 of Figure 1.
Figure 5:
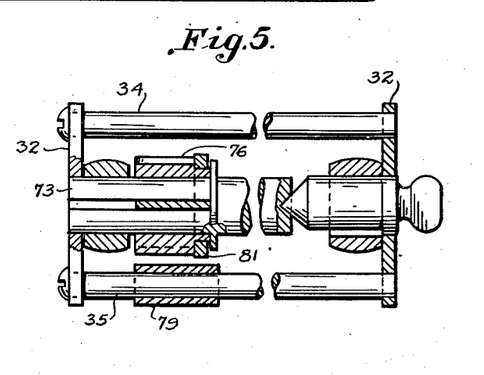
Figure 5 is a broken horizontal section taken on the line 5—5 of Figure 2.

The free end of the pawl 77 is shaped to seat readily in the notches 78 formed on the outer periphery of the ratchet 76. In order to effect rotation or partial rotation of the screw 13 intermittently, a sleeve disc 81 (see Figure 4) is mounted to rotate freely on the screw 73 and is provided at its upper end with an apertured lug 82 adapted to receive the pivot 83 of a bell crank lever 84 which has one of its arms 85 shaped as a pawl to engage the notches 78 of the ratchet 76, a spring 86 being wound around the pivot 83 and extending into contact with an edge of the sleeve disc 81 and with the upper edge of the other arm of the bell crank lever 84 in order to maintain the arm 85 constantly pressed against the notched periphery of the ratchet 76.

In order to effect intermittent operation of the pawl arm 85 the lower end of the sleeve disc 81 is pivoted to one end of a link 87, while the other end of said link 87 is pivoted to one end of an intermediate link 88, the free end of which is pivoted in turn to a lever 89 fulcrumed to the upper end of the standard 90 suitably secured to the upper face of the table 1. The end of the lever 89 remote from the link 88 is secured to one end of a tension spring 91 which has its other end detachably anchored to a bracket 92 fixed to the said upper face of the table 1.

The end of the lever 89 adjacent the intermediate link 88 is provided with an eye or aperture 93 in which is received a hook member 94 having one end of a cable suitably secured thereto. The cable 95 passes through an aperture 96 formed in the table 1 and has its other end secured to a sleeve 97 rotatably mounted on the shaft 98 of motor 99 which is suitably suspended from the lower face of the table 1. The sleeve 97 is adapted to be secured in any desired position of angular adjustment on the shaft 98 by means of the set screw 100; and this angular adjustment is provided to enable the tension of the spring 91 on the lever 89 to be regulated as desired, two or three turns of the cable 95 being wound on said sleeve 97, which acts as a winding drum for said cable.

The operation of the motor 99 is controlled by a pair of spring contact plates 101, and 102 (see Figure 18) which are mounted on the upper face of table 1 and are arranged so that the circuit including the motor 99 and the power mains 103 and 104 is normally broken. In order to close this circuit the rotating disc 10 is provided with an insulated lug 105 which, at the completion of every revolution of the disc 10 engages the spring contact plate 102 and forces it into circuit closing contact with the contact plate 101.

The energization of the motor 99 by closing the circuit through the contact plates 101 and 102 causes rotation of the motor shaft 99; and this rotation winds up the cable 95 to pull down the long arm of the fulcrum lever 89; and thereby through the links 87 and 88, disc 81 and bell crank pawl 85, effects a partial rotation of the ratchet 76 and also of the screw 73 to which the aforesaid ratchet is keyed.

It will be obvious from inspection of the drawings that the energization of the motor is of short duration and exists only during the period that the spring contact plates 101 and 102 are forced into circuit closing position by means of the moving lug 105. Just as soon as the lug 105 passes out of engagement with the contact plate 102 the circuit becomes broken, and the spring 91, acting on the lever 89, serves to restore the cable 95 and pawl actuating linkage connected thereto, to their original position of rest.

Where the source of power is alternating current, a synchronous motor 17 may be used to rotate the disc 10 and an A. C. motor must be used to effect the operation of the screw rotating linkage just described. However, it will be understood that an electro-magnet may be substituted for this motor where a supply of D. C. is available. In either case this pawl operating motor need not of necessity be operated by the same circuit as that controlling the operation of the motor 17 for rotating the disc, since it is obvious that it may be operated independently of the source of power for rotating the disc 10.

The disc 10 is provided with a pair of spring plates 106 and 107 adapted to clamp an electrically conducting plate 108 substantially centrally on the disc 10. This plate may be an image plate having the image formed thereon by a series of electrically conducting and non-conducting spots, in which case the instrument may be used as a transmitter. Of course, where the instrument is to be used as a receiver the plate will be covered with a suitable coating adapted to be operated upon by graver for the purpose of reproducing the image formed on the transmitter plate.

In the operation of this system it is essential that the tool 66, whether used as a tracer or as a graver be initially adjusted to the exact center of the rotated disc 10. Accordingly, the tool plate 36 is provided with a screw 109 rotatably mounted in a lug projecting laterally from the bracket 37 and threaded into an internally screw-threaded boss 110 formed on the upper face of the tool plate 36, suitable pin and slot connections 111 and 112 being provided to prevent rotation of the plate 36 relative to the bracket 37 and to permit proper sliding movement of the plate 36 on the bracket 37 for the purpose of effecting adjustment of the tool toward and from the center of the disc 10.

The bracket 37 slides freely on the guide rods 34 and 35; and these rods are provided with a bridge 113 adapted to be secured in adjusted position by means of set screws 114 and 115. This bridge is adjustable on said rods to form a stop for quickly positioning the tool plate so that the point of the tool 66 may be readily located on the diameter of the rotatable disc 10 perpendicular to the direction of movement of the tool plate on the guide rods 34 and 35. An adjustable stop screw 116, is mounted on the edge of the plate 36 with the head thereof adapted to contact with one side of the bridge 113. The tool plate, therefore, provides for the adjustment of the tool toward and from a diameter perpendicular to the direction of movement of said plate; and toward and from a diameter parallel to the direction of movement of said plate. In order to effect automatic movement of the tool plate from the center of the disc a detachable split nut 117 (see Figure 11) is positioned on the screw 73; and, to prevent rotation of this split nut on the said screw 73, a pin 118 is secured to one edge of the nut and extends over one of the guide rods 34 or 35 to slide thereon.

When the tool plate 36 is properly adjusted to the center of the disc 10 as shown in Figure 1 of the drawings, the split nut may be positioned on the screw 73 to contact with the adjacent edge of the tool plate. As soon as the screw is rotated by the pawl and ratchet mechanism previously described, the nut engages the side of the tool plate 36 and moves it to the right as shown in Figure 1 a distance determined by the spacings of the notches on the ratchet 76.

It is intended that the screws of this device shall be very finely threaded and that the screw will be rotated by the pawl and ratchet mechanism only a very small fraction of one complete revolution. For example, if there be 100 threads to the inch of screw and the ratchet be divided into 100 parts it is clear that the tool will be moved through 1/10,000ths of an inch for each complete revolution of the disc 10. The fineness of movement of the tool 66 will depend upon the accuracy of reproduction required, but as it is hardly possible to draw any kind of line finer than 1/10,000ths of an inch it seems obvious that this adjustment will insure the tracer or graver completely tracing or reproducing every element of the image to be traced or reproduced.

The one outstanding feature of advantage of this system of reproduction over the ordinary system in which the tool is moved continuously by a very finely threaded screw is that the tracing and reproduction is effected by the tracer and reproducer describing a complete series of contacting concentric circles instead of a very fine continuous spiral which results from the continuous rotation of the feed screw, and in which adjacent spirals are separated by the spacings between the threads of the screw. It will be obvious that since the feed screw of the present invention is moved for example only 1/10,000ths of an inch at each complete revolution of the disc 10, and since this movement is effected only at the instant when the insulated lug 105 operates the switch contact blades 101 and 102, and since the tool remains stationary during practically all of the rotation of the disc 10, that the tool or graver will describe a series of contacting concentric circles which practically cover every minute element of the image to be transmitted, and will reproduce all of such elements in the reproducer.

In order that every conducting spot on the image to be transmitted may be reproduced in the reproducer, it is desirable to vary the speed of rotation of the disc 10 substantially in inverse proportion to the distance of the tool or graver from the center of rotation of said disc. It is obvious that if the disc be rotated at a constant speed throughout all the movement of the tool 66 the parts of the image near the periphery of the disc will travel much faster under the tool than the parts nearer the center of said disc; and there will be a probability of some of the spots at the outer part of the image being missed by reason of the rapidity with which the conducting and non-conducting spots move with respect to the tool or graver.

To provide for this variable speed drive of the disc 10, the gearing illustrated in Figure 2 is omitted, and a friction driven disc 119 (see Figures 6 and 7) is suitably secured to the vertical shaft 7, and the drive shaft 21 of Figure 2 is replaced by a longer shaft 120 having an abutment washer 121 secured to the outer end thereof. A friction drive disc 122 is keyed on the shaft 120, and is reciprocated toward and from the shaft 7 by means of a yoke 123, which straddles the disc 122 and is formed on the end of an arm 124 rigidly fixed to the lower horizontal leg 125 of a V-shaped rod having a vertical branch 126 connecting the lower leg 125 to the parallel upper leg 127.

The leg 127 is slidably mounted in an apertured extension 128 secured to the cross plate 33 and a set screw 129 serves to lock this leg in any desired position in extension 128, for the purpose of locking the driving disc in any desired position relative to the driven disc 119, and thereby rotate disc 10 at any desired constant speed. For the purpose of varying the speed of rotation of disc 10 in proportion to the movement of the tool 66 toward and from the center of disc 10, the supporting bracket 37 for the tool plate 36 is provided with an apertured lug 130, through which the leg 127 slides freely, and a set screw 131 may be used to lock the leg 127 to the lug 130.

This means that by locking the V-shaped rod to the extension 128 and releasing the set screw 129, the driving disc 122 may be held in any desired position on driven disc 119 to rotate disc 10 at any desired constant speed. When it is desired to vary the speed of rotation of the disc 10 in proportion to the radial movement of the tool 66, the set screw 129 is released and the set screw 131 is tightened to lock the bracket 137 to the leg 127; thereby causing the constant speed drive disc to move toward and from shaft 7 and vary the speed of rotation of the disc 10 in proportion to the distance of tool 66 from the center of disc 10.

In the modified form shown in Figures 6 and 7, the gear box may be omitted and the shaft of any suitable motor may be used to drive the disc 122 directly. An electro-magnet 132 may be substituted for the motor 99 for operating the ratchet and pawl drive for the screw 73. In this case the magnet must be energized by a battery of any source of direct current connected in circuit with the spring blade contacts 101 and 102, operated by lug 105 at every complete rotation of the disc 10.

Each instrument includes a relay, controlled by two poles of a four-pole double throw switch, for transmitting the electrical impulses from the tool 66, when used as a scanner or tracer, through a connecting transmission line or medium, to a similar instrument for operating the tool thereof as a reproducer. The details of this relay and switch mechanism, and the operation of the system, will be best understood by reference to the diagrammatic layout of Figure 18. In this figure the parts of the instrument used as a receiver will be designated by the same reference numerals primed as are applied to similar parts in the instrument used as a transmitter. This is merely for convenience of description as it must be understood that both instruments are similar in every respect.

Figure 18:
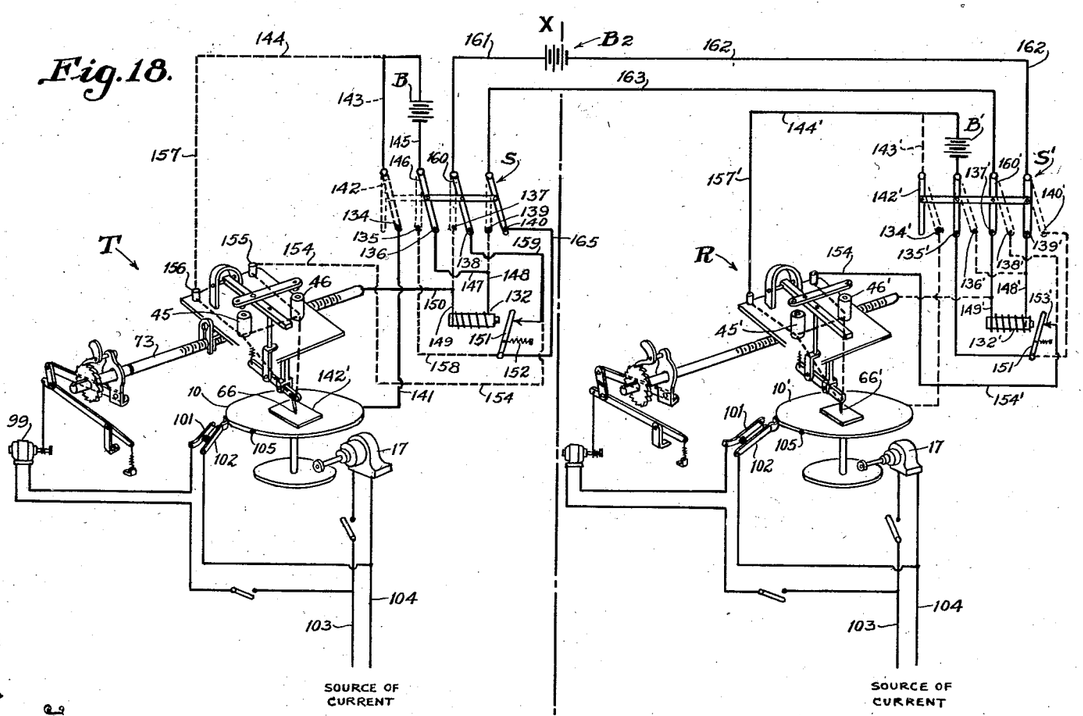
Figure 18 is a wiring diagram illustrating two of the combined sender-receivers, in which one of the combination instruments is shown in operation as a sender while the other, and similar instrument, is shown in operation as a receiver.

As shown in Figure 18 the instrument to the left of line X—X has its switch S in position to cause operation of the instrument as a transmitter; while the instrument to the right of this line has its switch in position to cause operation of the latter instrument as a receiver or reproducer.

In the instrument T, the disc 10 and feed screw 73 are operated by any of the forms of driving mechanism already described, and are suitably insulated from the driving mechanism. The screw 73 is in electrical contact with the bracket 37 and tool plate 36, which is also in electrical contact with the tool 66. When the instrument is used as a transmitter the circuit through the relay magnets 45 and 46 is broken as will be shown later, but the tool 66 remains in electrical contact with the screw 73. When used as a receiver the circuit including the tool 66 (now used as a graver) is effected through the magnets 45 and 46 and the circuit through the feed screw 73 is broken.

In the four-pole double throw switch there are seven contacts, 134, 135, 136, 137, 138, 139 and 140. The contact 134 is connected by line 141 to the rotating disc 10, which is in electrical contact with the conducting image plate 142'. The pole 142 of switch S has its pivoted end connected to the line 143, tapped to line 144 leading to the negative terminal of battery B, the positive terminal of which is connected to the pivot end of pole 146 arranged to swing between contacts 135 and 136, but shown herein in transmitter position in contact with contact 136. The contact 136 is connected by wire 147 to a lead-in wire 148 connecting contact 139 to the lead-in end of electro-magnet 132. The lead-out end of magnet 132 is connected by wire 149 to contact 137; and a tap 150 connects the wire 147 to the feed screw 73. By this arrangement the relay magnet is operated by the local battery B, the circuit being: battery B, line 145, pole 146, lines 147 and 148, magnet 132, wires 149 and 150, screw 73, tool supporting structure and tool 66 through plate 142, disc 10, line 141, pole 142, and lines 143 and 144 to battery B. It will be understood that the current through this circuit will be interrupted as the tool slides over the conducting and non-conducting spots of the image on plate 142 during the rotation of disc 10.

The pivoted armature 151 of the relay is normally held by a tension spring 152 against a contact 153, which is connected by line 154 to terminal 155 on the tool plate 36. Suitable wiring leads from terminal 155 through the electro-magnets 45 and 46 to terminal 156, connected by wire 157 to wire 144 leading to battery B. A wire 158 connects the contact 135 to the pivot end of armature 151 and completes the circuit through the graver operating magnets 45 and 46 when pole 146 is in contact with contact 135. It will be evident from inspection of Figure 18 that when the instrument is used as a transmitter this circuit is broken.

The circuit from the transmitter T to receiver R is effected through wire 159 connecting the back contact wire 154 to the contact to the transmitter contact 138 through switch pole 160, wire 161, battery B2, wire 162, switch pole 163', electro-magnet 132', wire 149', contact 137', switch pole 160', wire 163, switch pole 164, contact 139, and wire 165 to pivot end of armature 151.

When the instrument T is used as a transmitter it is evident that the circuit through the electro-magnets 45 and 46 is broken and that the armature 151 acts as a circuit maker and breaker of current from battery B2 through the receiver magnet 132'. The armature 151' of the receiver R is now included in the circuit of battery B1, and controls the intermittent energization of the electro-magnets 45' and 46' to operate the tool 66 as a reproducer. In the receiver operation no current flows through the disc 10' because the switch pole 142' is out of contact with the contact 134'.

It will be obvious that the receiver R may be used as a transmitter by swinging the switch S to make contact with contacts 134', 136', 138' and 140'; and that the transmitter T may be converted to a receiver merely by swinging the switch S to make contact with the contacts 135, 137 and 139.

It is believed the reciprocal operation of the two instruments will be apparent without further specific description to persons skilled in the art, as the diagram clearly illustrates the mutual relationship between the two instruments and their cooperating connections.

Figure 9:
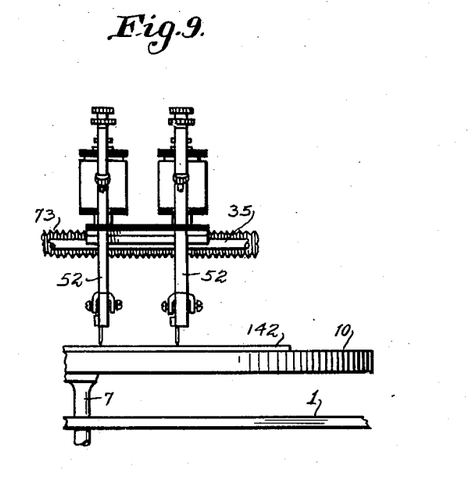
Figure 9 is a fragmentary elevation illustrating a modification of the scanning and graving part of the apparatus.

In order to shorten the time of transmission and reception, it is contemplated that a plurality of tools 66 may be supported by the tool plate 36 in spaced apart relation so that different parts of the same image may be simultaneously transmitted to a similar distant instrument operating as a receiver. This arrangement is merely indicated in Figure 9 of the drawings, as the structural changes necessary to use it will be obvious to persons skilled in the art.

In cases where it is found necessary or desirable to use one instrument constantly as a transmitter, the electro-magnets 45 and 46 and associated relay structure may be replaced by the slide 166 (see Figure 17) mounted to slide on the guide rods 34 and 35 instead of the tool plate bracket 37. The slide 166 is apertured centrally to move freely over screw 73 and is moved along the rods 34 and 35 by means of the split nut 117 used in the same manner as on the tool plate 36.

A bifurcated lug 167 depends from the slide 166 and has pivoted thereto a lug 168 formed on a sleeve 169 in which a rod 170 is mounted to slide. One end of rod 170 has pivoted thereto, an arm 171 which is centrally bored to receive a tracer tool 172 adapted to be clamped on the bore of arm 171 by the set screw 173.

The other end of rod 170 is bored and internally screw threaded to receive an adjusting screw 174 provided with a head 175. A small set screw is screw threaded radially into the sleeve 169, and slidably engages an annular groove formed in screw 174 to hold the screw rotatably in said sleeve. A leaf spring is secured to the rod 170 and to arm 171 to cause the tracer 172 to exert a constant yielding pressure on the image to be transmitted.

It will be obvious that the screws 73 may be turned sufficiently at each complete revolution of the disks 10 or 10' to cause any desired separation or overlap of the concentric circles described by the tracer or graver. It is preferable, however, that these circles just contact with each other, in order that every element of the image be properly transmitted and received. An overlap is likely to wipe out part of the previously scanned or graved circles, while a separation of the circles would result in omitting many of the elements of the image.

Wherever the word "table" is used in this application, it is to be understood as referring to any suitable supporting frame work; and is not to be considered as limiting the invention to use with a flat plate such as is shown in the drawings. In the claims, it is convenient to use the word "table" to distinguish this supporting part of the device from the tool "supports" slidable over the main supporting framework.

While I have described a specific embodiment of my invention, it must be understood that it is not limited to the particular form shown, but extends broadly to such embodiments and modification thereof as may come with in the scope of the claims appended hereto.

What I claim is:

1. In a telegravure system, an instrument including a table, a disc rotatable on said table, a guide on said table extending parallel to a diameter of said disc, a tool support movable rectilinearly on said guide, a tool adjustable on said support toward and from the said diameter, and means operated by the rotation of said disc for intermittently moving said tool support and tool along said guide.

2. In a telegravure system, an instrument including a table, a disc rotatable on said table, a guide on said table extending parallel to a diameter of said disc, a tool support movable rectilinearly on said guide, a tool adjustable on said support toward and from said diameter, and means operated by said disc at each complete rotation thereof for intermittently moving said support and tool along said guide.

3. In a telegravure system, an instrument including a table, a disc rotatable on said table, constant speed mechanism for rotating said disc, a guide on the table extending parallel to a diameter of said disc, a tool support slidable on said guide, a screw rotatably mounted on said table parallel to said guide, a tool adjustable on said support toward and from said diameter, means operable only at each complete rotation of the disc for imparting intermittent rotation to said screw, and means detachably connected to said screw for moving said support in one direction only.

4. In a telegravure system, an instrument including a table, a disc rotatable thereon, a pair of standards on said table, a frame supported at the upper end of said standards and including a pair of parallel guide rods arranged parallel to a diameter of said disc, passing through the axis of rotation thereof, a tool support movable on said guide rods, a tool slidable on said support toward and from said diameter, a screw rotatably mounted between said guide rods, a nut detachably connected to said screw and adapted to contact with said tool support to slide the latter on said rods, and means for fractionally rotating said screw at each complete rotation of said disc.

5. In a telegravure system, an instrument including a table, a disc rotatable thereon, a guide frame mounted on said table, a tool support mounted on said frame to slide in a direction parallel to a diameter of said disc, a tool adjustably mounted on said support, means operable at each complete rotation of said disc for intermittently moving said tool support on said frame, a constant speed motor, and means operated by said motor for driving said disc at speeds which decrease in proportion to the distance of the tool from the center to the periphery of said disc.

6. In a telegravure system, an instrument including a table, a disc rotatable thereon, a guide on said table parallel to a diameter of said disc, a tool slidably mounted on said guide, means for intermittently sliding said tool at each complete rotation of said disc, and means for rotating said disc at speeds which vary in proportion to the distance of said tool from the center of said disc.

7. In a telegravure system, an instrument including a table, a disc rotatable thereon, a guide on said table parallel to a diameter of said disc, a tool slidable on said guide, means for intermittently sliding said tool at each complete rotation of said disc, a constant speed motor, means adjustably connected to said motor to drive said disc at any desired constant speed or at speeds which vary in proportion to the distance of the tool from the center of rotation of said disc.

8. In a telegravure system, a transmitter including a member having an image transmitting surface, a receiver including a member having an image receiving surface, means for continuously rotating said members in synchronism and in the same direction of rotation, a tracer in yielding contact with said transmitting surface, a tool arranged to operate on said receiving surface, and means for intermittently moving said tracer and tool radially from the centers of rotation of said members at each complete revolution of said members.

9. In a telegravure system, a transmitter including a member having an image transmitting surface, a receiver including a member having an image receiving surface, means for continuously rotating said members in synchronism, a tracer in yielding contact with said transmitting surface, a tool arranged to operate on said receiving surface, and means for moving said tracer and tool through a predetermined distance radially from the center of rotation of their respective members at each complete revolution of said members, each of said means remaining fixed between said periodic movements.

10. In a telegravure system, a transmitter and a receiver in circuit with each other, said trasmitter including a member having a transmitting surface with an image formed thereon by conducting and non-conducting spots, a tracer in continuous yielding contact with said transmitting surface, a receiver including a member having an image receiving surface, a reproducing device adapted to operate on said receiving surface, means for continuously rotating said members in synchronism with each other, means for moving said tracer and device a predetermined distance along a diameter of their respective members and operable only at each complete rotation of said members from a given initial position.

11. In a telegravure system, a transmitter and a receiver each comprising a table, a disc rotatable on said table and adapted to have a plane image transmitting or receiving plate secured thereto, means for continuously rotating said discs in synchronism with each other, a tool mounted on said table to slide along a diameter of said disc and means for intermittently moving said tool at each complete revolution of said disc.

12. In a telegravure system, a transmitter and a receiver each comprising a table, a disc rotatable on said table and adapted to have a plane image transmitting or receiving plate secured thereto, means for continuously rotating said discs in synchronism with each other, a tool mounted on said table to slide along a diameter of said disc, means for intermittently moving said tool at each complete revolution of said disc, and means for varying the speeds of rotation of said disc in proportion to the distances of said tool from the center of said disc.

13. A telegravure system including a transmitter and a receiver each of which comprises a table and a disc rotatable thereon, a tool movable rectilinearly on said table from the center to the periphery of said disc, and means operable at the end of each revolution of said disc for moving said tool through a predetermined distance radially of said disc.

14. A telegravure system, including a transmitter instrument and a receiver instrument, each of which comprises a table and a disc rotatable thereon, a tool movable on said table radially of said disc, means operable at the end of each revolution of said disc for moving said tool through a predetermined distance, means connecting said instruments to each other to transmit the movements of one to the other, and means on each instrument adjustable to convert the said instrument from a transmitter to a receiver and vice versa.

15. A telegravure system including two similar instruments each of which comprises a table and a disc rotatable thereon, a tool slidable on said table radially from the center of said disc, means operable at the end of each revolution of said disc for moving said tool through a predetermined distance radially of said disc, a circuit including each of said instruments, and a switch connected to said circuit and to said instruments for converting each instrument from a receiver to a transmitter and vice versa.

16. A telegravure system including two similar instruments each of which comprises a table and a disc rotatable thereon, a tool slidable on said table radially from the center of said disc, means operable at the end of each revolution of said disc for moving said tool through a predetermined distance radially of said disc, a circuit including each of said instruments, and a four-pole double throw switch included in said circuit for converting said instrument from a receiver to a transmitter and vice versa.

17. A telegravure system including two similar instruments each of which comprises a table and a disc rotatable thereon, a tool slidable on said table radially from the center of said disc, and means controlled by the revolution of said disc for moving said tool through a series of concentric circles which increase in radii successively from the center of said disc.

18. A telegravure system including two similar instruments each of which comprises a table and a disc rotatable thereon, a tool slidable on said table radially from the center of said disc, means controlled by the revolution of said disc for moving said tool successively into a series of fixed positions relative to said disc for describing a series of concentric circles which increase in radii successively from the center of said disc, and means for rotating said disc at speeds which vary in proportion to the distance of the tool from said center.

19. A telegravure system including two similar instruments each of which comprises a table and a disc rotatable thereon, a tool slidable on said table radially from the center of said disc, means controlled by the revolution of said disc for moving said tool successively into a series of fixed positions relative to said disc for describing a series of concentric circles which increase in radii successively from the center of said disc, and means for rotating said disc at speeds which vary inversely as the distance of the tool from said center.

20. In a telegravure system, the method of transmitting and reproducing an image or any part thereof, formed on a surface by conducting and non-conducting spots, which consists in moving a tracer to describe concentric circles of radii increasing successively from a point selected as a center on said image, and then moving a reproducer synchronously in a similar series of concentric circles to reproduce the said image.

21. In a telegravure system, a transmitter including a member having an image transmitting surface, a receiver including a member having an image receiving surface, means for continuously rotating said members in synchronism, a tracer in yielding contact with said transmitting surface, a tool arranged to operate on said receiving surface, and means for intermittently moving said tracer and tool at each complete revolution of said members.

22. In a telegravure system, a transmitter including a member having an image transmitting surface, a receiver including a member having an image receiving surface, means for continuously rotating said members in synchronism, a tracer in yielding contact with said transmitting surface, a tool arranged to operate on said receiving surface, and means for moving said tracer and tool through a predetermined distance at each complete revolution of said members, each of said means remaining fixed between said periodic movements.

23. In a telegravure system, a transmitter and a receiver in circuit with each other, said transmitter including a member having a transmitting surface with an image, a tracer in continuous yielding contact with said transmitting surface, a receiver including a member having an image receiving surface, a reproducing device adapted to operate on said receiving surface, means for continuously rotating said members in synchronism with each other, means for moving said tracer and device a predetermined distance along their respective members and operable only at each complete rotation of said members from a given initial position.

24. In a telegravure system, a transmitter and a receiver each comprising a table, a disc rotatable on said table and adapted to have a plane image transmitting or receiving plate secured thereto, means for continuously rotating said discs in synchronism with each other, a tool mounted on said table to slide in a direction parallel to a diameter of said disc, and means for intermittently moving said tool at each complete revolution of said disc.

25. In a telegravure system, a transmitter and a receiver each comprising a table, a disc rotatable on said table and adapted to have a plane image transmitting or receiving plate secured thereto, means for continuously rotating said discs in synchronism with each other, a tool mounted on said table to slide in directions parallel to a diameter of said disc, means for intermittently moving said tool at each complete revolution of said disc, and means for varying the speeds of rotation of said disc in proportion to the distances of said tool from the center of said disc.

26. A telegravure system including a transmitter and a receiver each of which comprises a table and a disc rotatable thereon, a tool movable rectilinearly on said table in directions parallel to a diameter of the disk, and means operable at the end of each revolution of said disc for so moving said tool through a predetermined distance.

27. A telegravure system, including a transmitter instrument and a receiver instrument, each of which comprises a table and a member rotatable thereon, a tool movable on said table along said member, means operable at the end of each revolution of said member for moving said tool through a predetermined distance, means connecting said instruments to each other to transmit the movements of one to the other, and means on each instrument adjustable to convert the said instrument from a transmitter to a receiver and vice versa.

28. A telegravure system including two similar instruments each of which comprises a support and a member rotatable thereon, a tool slidable on said support along said member, means operable at the end of each revolution of said member for so moving said tool through a predetermined distance, a circuit including each of said instruments, and a switch connected to said circuit and to said instruments for converting each instrument from a receiver to a transmitter and vice versa.

29. A telegravure system including two similar instruments each of which comprises a support and a member rotatable thereon, a tool slidable on said support along said member, means operable at the end of each revolution of said member for so moving said tool through a predetermined distance, a circuit including each of said instruments, and a four-pole double throw switch included in said circuit for converting said instrument from a receiver to a transmitter and vice versa.

30. In a telegravure system, the method of transmitting and reproducing an image or any part thereof, which consists in moving a tracer to describe concentric circles of radii increasing successively from a point selected as a center on said image, and then moving a reproducer synchronously in a similar series of concentric circles to reproduce the said image.

In testimony whereof I affix my signature.

CECIL F. WATTS.